(12) United States Patent
Moon et al.

(10) Patent No.: US 7,562,574 B2
(45) Date of Patent: Jul. 21, 2009

(54) METHOD AND DEVICE FOR MEASURING ACCELERATION AND/OR INCLINATION BY USING THERMAL CONVECTION OF A FLUID

(75) Inventors: Il-Kwon Moon, Daejeon (KR); Dae-Hwa Jung, Pohang (KR); Yoon-Hee Jeong, Pohang (KR)

(73) Assignee: Hankuk Sensys Co., Ltd., Pohang, Kyungsangbukdo (JP)

( * ) Notice: Subject to any disclaimer, the term of this patent is extended or adjusted under 35 U.S.C. 154(b) by 367 days.

(21) Appl. No.: 11/659,562

(22) PCT Filed: Aug. 1, 2005

(86) PCT No.: PCT/KR2005/002509

§ 371 (c)(1),
(2), (4) Date: Feb. 5, 2007

(87) PCT Pub. No.: WO2006/014065

PCT Pub. Date: Feb. 9, 2006

(65) Prior Publication Data

US 2008/0087082 A1    Apr. 17, 2008

(30) Foreign Application Priority Data

Aug. 6, 2004   (KR) .................. 10-2004-0061995
Jun. 10, 2005  (KR) .................. 10-2005-0049721

(51) Int. Cl.
*G01P 3/26* (2006.01)
(52) U.S. Cl. .................. 73/521; 73/509; 73/514.05; 73/1.37; 73/510
(58) Field of Classification Search .................. 73/509, 73/514.05, 1.37
See application file for complete search history.

(56) References Cited

U.S. PATENT DOCUMENTS 2,440,189 A * 4/1948 Zworykin .................. 318/648

(Continued)

FOREIGN PATENT DOCUMENTS

DE   4238093 A1 * 10/1993

(Continued)

*Primary Examiner*—Hezron Williams
*Assistant Examiner*—Samir M Shah
(74) *Attorney, Agent, or Firm*—Nixon Peabody LLP (57) ABSTRACT

Provided is an apparatus for measuring acceleration and a tilt angle using thermal convection of a fluid which includes a container containing the fluid, a heating body including a first heating element and a second heating element arranged in the container and a crosspoint that is formed as end portions of the first and second heating elements are electrically connected, and radiating heat when current is applied through the other end portions of the first and second heating elements, and a thermocouple including a thermocouple junction that contacts the crosspoint of the heating body and being point-symmetric with the heating body with respect to the crosspoint of the heating body, wherein a voltage between both end portions of the thermocouple is measured to calculate a temperature of the crosspoint of the heating body. Acceleration acting in a direction along an imagery line that passes the crosspoint of the heating body on an imagery plane including the heating body and a tilt angle that is the degree of inclination of the imagery line with respect to the direction of the Earth's gravity are measured using a temperature of the crosspoint of the heating body.

6 Claims, 6 Drawing Sheets

U.S. PATENT DOCUMENTS

| | | | | |
|---|---|---|---|---|
| 2,455,394 A | * | 12/1948 | Webber | 338/43 |
| 5,581,034 A | * | 12/1996 | Dao et al. | 73/514.09 |
| 6,182,509 B1 | * | 2/2001 | Leung | 73/514.05 |
| 7,069,785 B2 | * | 7/2006 | Chou | 73/514.09 |
| 7,392,703 B2 | * | 7/2008 | Zhao et al. | 73/514.05 |
| 7,424,826 B2 | * | 9/2008 | Hua et al. | 73/514.05 |
| 7,426,862 B2 | * | 9/2008 | Dido et al. | 73/514.09 |
| 2003/0062304 A1 | * | 4/2003 | Sueyoshi et al. | 210/512.1 |
| 2005/0011260 A1 | * | 1/2005 | Arndt et al. | 73/204.26 |
| 2005/0028287 A1 | * | 2/2005 | Fee | 5/655 |

FOREIGN PATENT DOCUMENTS

| | | |
|---|---|---|
| JP | 07-260820 | 10/1995 |
| JP | 2000-193677 | 7/2000 |

* cited by examiner

METHOD AND DEVICE FOR MEASURING ACCELERATION AND/OR INCLINATION BY USING THERMAL CONVECTION OF A FLUID

CROSS REFERENCE TO RELATED APPLICATIONS or PRIORITY CLAIM

This application is a national phase of International Application No. PCT/KR2005/002509 entitled "A Method And Device For Measuring Acceleration And/Or Inclination By Using Thermal Convention Of A Fluid", which was filed on Aug. 1, 2005, which was not published in English, and which claims priority of the Korean Patent Application Nos. 10-2004-0061995 filed Aug. 6, 2004 and 10-2005-0049721 filed Jun. 10, 2005.

TECHNICAL FIELD

The present invention relates to an apparatus and method for measuring acceleration and tilt angle, and more particularly, to an apparatus and method for measuring acceleration and tilt angle with respect to the direction of the Earth's gravity using a phenomenon that the degree of cooling of a heating body being cooled by thermal convection of a fluid such as gas or liquid is dependent on the direction and magnitude of acceleration.

BACKGROUND ART

Recently, acceleration measuring devices, or accelerometers, are widely used for automobile airbags, suspension systems, position control systems of mobile bodies for the aeronautical or military use, and motion input devices and impact detection devices for electronic products such as computers or mobile phones.

Conventional accelerometers are classified into a servo type, a piezoelectric type, a piezoresistive type, and a capacitive type according to the types of operation. In these types of accelerometers, a mobile body having a mass "m" is accelerated at an acceleration "a" by applying a force "F" to the mobile body, in which F=ma. In this state, acceleration is obtained by measuring a control signal, a piezovoltage, a piezoresistance, or a capacitance which varies according to the displacement of the mobile body. To improve accuracy in measuring the acceleration in the above conventional accelerometers, a structure capable of accurately measuring the displacement of the mobile body that varies according to the acceleration is needed. However, such a mobile body requires a complicated manufacturing process and durability of accelerometers are deteriorated.

Meanwhile, the conventional convection type accelerator using the thermal convection of a fluid can be embodied as disclosed in U.S. Pat. Nos. 2,440,189, 2,455,394, 5,581,034, and 6,182,509 and Japanese Patent Nos. hei 7-260820 and 2000-193677. These convection type accelerometers exhibit sensitivity and response speed lower than accelerometers using the above mobile body. When the pressure of a fluid changes according to the change in the external pressure or temperature, acceleration cannot be accurately measured. Thus, a packaging method is limited and the external temperature needs to be measured separately.

DISCLOSURE OF INVENTION

To solve the above and/or other problems, the present invention provides an apparatus for measuring acceleration and tilt angle which has a simple structure without a mobile body and uses a phenomenon that the degree of cooling of a head body being cooled by the thermal convection of a fluid varies according to the direction and magnitude of acceleration, so that a manufacturing process is simplified, a manufacturing cost is reduced, and durability is enhanced.

The present invention provides a method for measuring acceleration and tilt angle which exhibits an improved sensitivity and response speed compared to the conventional convection type accelerometers and can more accurately measure acceleration by compensating for an effect by the change in the pressure of the fluid on the acceleration.

According to an aspect of the present invention, an apparatus for measuring acceleration and a tilt angle using thermal convection of a fluid comprises a container containing the fluid, a heating body including a first heating element and a second heating element arranged in the container and a crosspoint that is formed as end portions of the first and second heating elements are electrically connected, and radiating heat when current is applied through the other end portions of the first and second heating elements, and a thermocouple including a thermocouple junction that contacts the crosspoint of the heating body and being point-symmetric with the heating body with respect to the crosspoint of the heating body, wherein a voltage between both end portions of the thermocouple is measured to calculate a temperature of the crosspoint of the heating body, wherein acceleration acting in a direction along an imagery line that passes the crosspoint of the heating body on an imagery plane including the heating body and a tilt angle that is the degree of inclination of the imagery line with respect to the direction of the Earth's gravity are measured using a temperature of the crosspoint of the heating body.

According to an aspect of the present invention, an apparatus for measuring acceleration and a tilt angle using thermal convection of a fluid comprises a container containing the fluid, a heating body arranged in the container, having a rectangular shape to have a first crosspoint, a second crosspoint, a third crosspoint, and a fourth crosspoint that are electrically connected, being point-symmetrical with respect to an imagery center point located in the middle of the first and second cross points facing each other, and radiating heat when current is applied, a first thermocouple including a thermocouple junction that contacts the first crosspoint of the heating body, wherein a voltage between both end portions of the first thermocouple is measured to calculate a temperature of the first crosspoint of the heating body, and a second thermocouple including a thermocouple junction that contacts the second crosspoint of the heating body and being point-symmetric with the first thermocouple with respect to the imagery center point, wherein a voltage between both end portions of the second thermocouple is measured to calculate a temperature of the second crosspoint of the heating body, wherein acceleration acting in a direction along an imagery line that passes the first and second crosspoints and a tilt angle that is the degree of inclination of the imagery line with respect to the direction of the. Earth's gravity are measured using a difference in the temperature between the first and second crosspoints of the heating body.

Current is applied to the heating body through the third and fourth cross points.

The apparatus may further comprise a third thermocouple including a thermocouple junction that contacts the third crosspoint of the heating body, wherein a voltage between both end portions of the third thermocouple is measured to calculate a temperature of the third crosspoint of the heating body, and a fourth thermocouple including a thermocouple junction that contacts the fourth crosspoint of the heating body and being point-symmetric with the third thermocouple with respect to the imagery center point, wherein a voltage between both end portions of the fourth thermocouple is measured to calculate a temperature of the fourth crosspoint of the heating body, wherein acceleration acting in a direction along an imagery line that passes the third and fourth crosspoints and a tilt angle that is the degree of inclination of the imagery line passing the third and fourth cross points with respect to the direction of the Earth's gravity are measured using a difference in the temperature between the third and fourth crosspoints of the heating body.

In this case, in order to supply current to the heating body, four electrodes are electrically connected to the heating body and point-symmetrical with respect to the imagery center point.

According to another aspect of the present invention, a method of measuring acceleration and a tilt angle using thermal convection of a fluid using the above apparatus comprises applying current to the heating body to make the heating body radiate heat to facilitate thermal convection of the fluid, measuring a voltage between both end portions of the first thermocouple to calculate a temperature of the first crosspoint of the heating body using the measured voltage and measuring a voltage between both end portions of the second thermocouple to calculate a temperature of the second crosspoint of the heating body using the measured voltage, and calculating acceleration acting in a direction along an imagery line that passes the first and second crosspoints and a tilt angle that is the degree of inclination of the imagery line with respect to the direction of the Earth's gravity, using a difference between the above obtained temperatures.

The method further comprises summing the temperatures calculated in the calculating of the temperature of the first and second crosspoints of the heating body and calculating a pressure of the fluid in the container using the sum of the temperatures, and correcting acceleration and a tilt angle obtained from the calculating of the acceleration and the tilt angle using a pressure of the fluid obtained from the calculating of the pressure of the fluid in the container.

BEST MODE FOR CARRYING OUT THE INVENTION

Hereinafter, embodiments of the present invention are described in detail with reference to the accompanying drawings.

Figure 1:
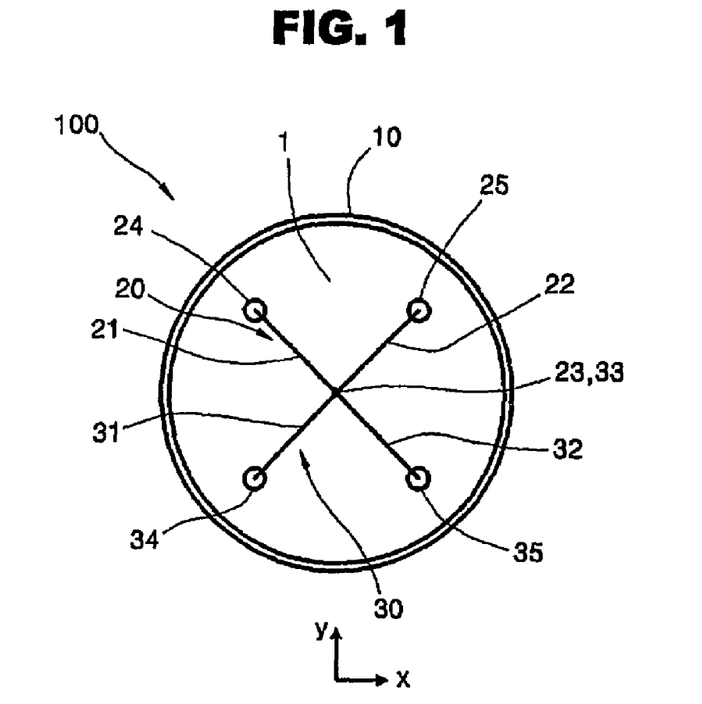
FIG. 1 is a cross-sectional view of an apparatus for measuring acceleration and tilt angle according to an embodiment of the present invention, in a z-axis direction.
Figure 2:
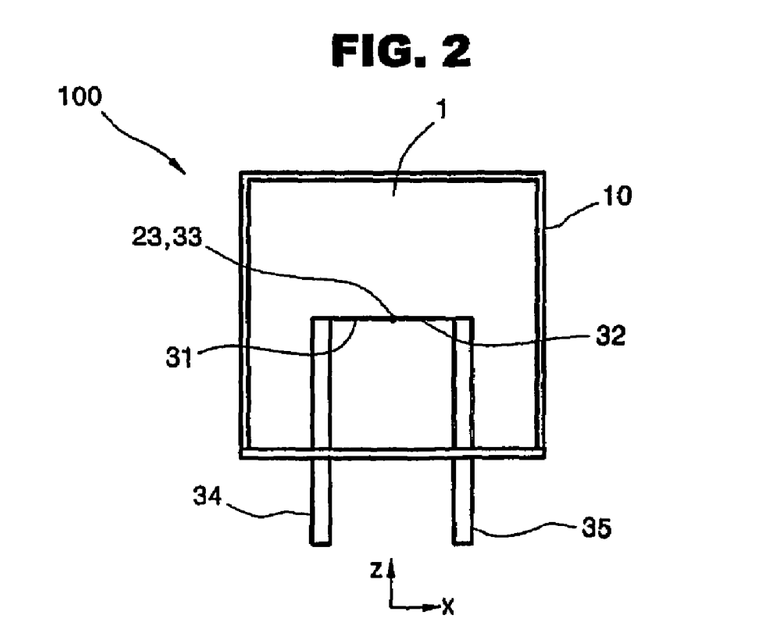
FIG. 2 is a cross-sectional view of the apparatus of FIG. 1, in a y-axis direction.
Figure 3:
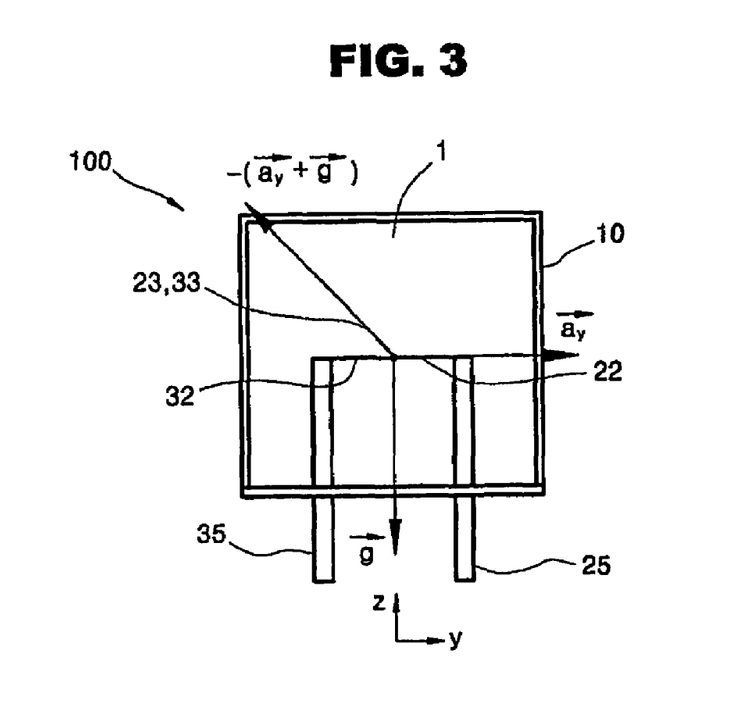
FIG. 3 is a cross-sectional view of the apparatus of FIG. 1 when acceleration is applied to the y-axis direction, in which the sum of the acceleration and the acceleration of gravity is indicated by vectors.
Figure 4:
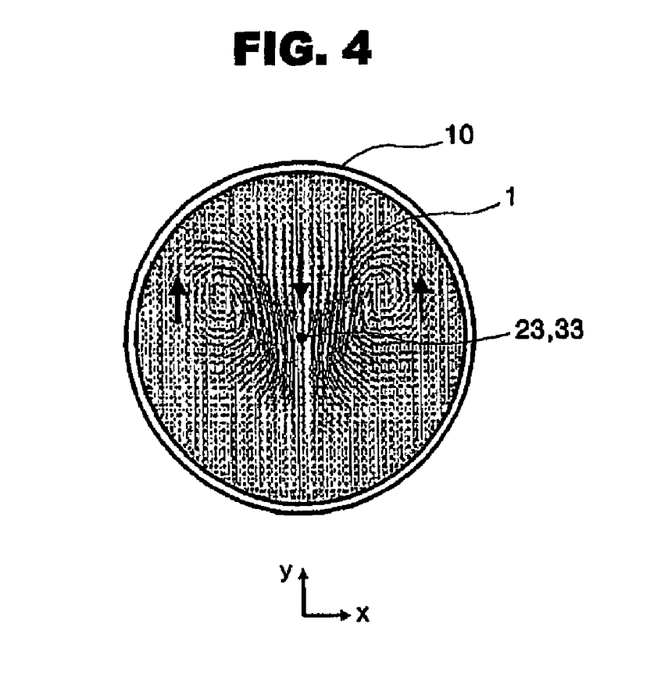
FIG. 4 is a view schematically illustrating the direction and pattern of thermal convection generated on the x-y plane when acceleration having the same magnitude of the acceleration of gravity "g" is applied in the +y direction in a container of the apparatus of FIG. 1.
Figure 5:
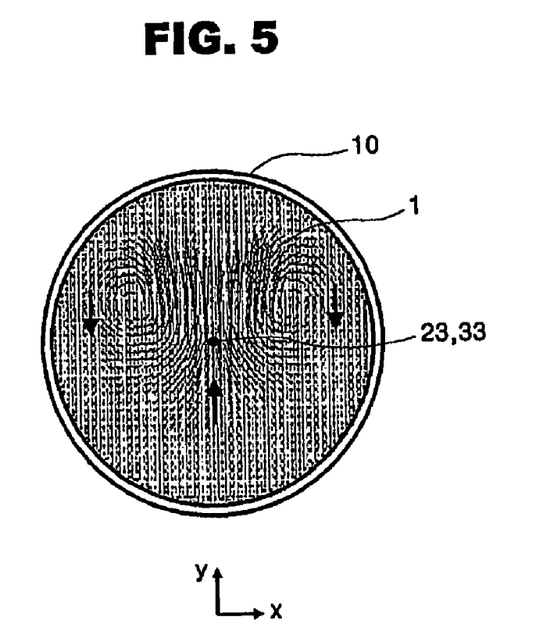
FIG. 5 is a view schematically illustrating the direction and pattern of thermal convection generated on the x-y plane when acceleration having the same magnitude of the acceleration of gravity "g" is applied in the −y direction in the container of the apparatus of FIG. 1.
Figure 6:
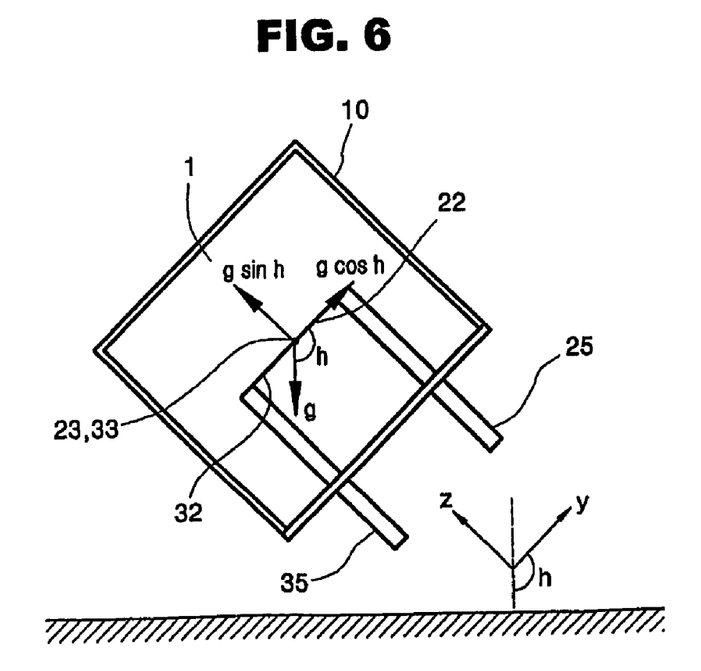
FIG. 6 is a cross-sectional view for explaining a y tilt angle in the apparatus of FIG. 1.

FIG. 1 is a cross-sectional view of an apparatus for measuring acceleration and tilt angle according to an embodiment of the present invention, in a z-axis direction. FIG. 2 is a cross-sectional view of the apparatus of FIG. 1, in a y-axis direction. FIG. 3 is a cross-sectional view of the apparatus of FIG. 1 when acceleration is applied to the y-axis direction, in which the sum of the acceleration and the acceleration of gravity is indicated by vectors. FIG. 4 is a view schematically illustrating the direction and pattern of thermal convection generated on the x-y plane when acceleration having the same magnitude of the acceleration of gravity "g" is applied in the +y direction in a container of the apparatus of FIG. 1. FIG. 5 is a view schematically illustrating the direction and pattern of thermal convection generated on the x-y plane when acceleration having the same magnitude of the acceleration of gravity "g" is applied in the −y direction in the container of the apparatus of FIG. 1. FIG. 6 is a cross-sectional view for explaining a y tilt angle in the apparatus of FIG. 1.

Referring to FIGS. 1 through 3 and FIG. 6, an apparatus 100 for measuring acceleration and a tilt angle using thermal convection of a fluid according to an embodiment of the present invention includes a container 10, a heating body 20, and a thermocouple 30.

The container 10 contains a fluid 1. The fluid 1 may be either gas or liquid. The heating body 20 is arranged in the container 10 and includes a first heating element 21, a second heating element 22, and a crosspoint 23. The first and second heating elements 21 and 22 are formed of a metal material such as nickel or chromium. In the present embodiment, the first and second heating elements 21 and 22 have the same length and resistance. The crosspoint 23 is formed by electrically connecting end portions of the first and second heating elements 21 and 22. The other end portions of the first and second heating elements 21 and 22 are electrically connected to electrodes 24 and 25, respectively. The electrodes 24 and 25 are connected to a current supply apparatus (not shown) which supplies current. When the current supply apparatus supplies current, joule heat is generated in the first and second heating elements 21 and 22.

The thermocouple 30 is point-symmetrical with the heating body 20 with respect to the crosspoint 23 of the heating body 20, as shown in FIG. 1. The thermocouple 30 includes a first conductive wire 31, a second conductive wire 32, and a thermocouple junction 33. The first and second conductive wires 31 and 32 are formed of a metal material such as nickel or chromium. The first and second conductive wires 31 and 32 are formed of different metals such that the first conductive wire 31 is formed of nickel and the second conductive wire 32 is formed of metal that is not nickel, for example, chromium. The thermocouple junction 33 is formed by electrically connecting end portions of the first and second conductive wires 31 and 32. The thermocouple junction 33 contacts the crosspoint 23 of the heating body 20. The other end portions of the first and second conductive wires 31 and 32 are electrically connected to the electrodes 34 and 35, respectively. A voltage measurement apparatus (not shown) for measuring a voltage between the electrodes 34 and 35 is connected to the electrodes 34 and 35.

The temperature of the crosspoint 23 of the heating body 20 can be calculated using a voltage measured by the voltage measurement apparatus. The magnitude and direction of acceleration and a tilt angle can be independently measured using the calculated temperature. The direction of the acceleration is an imagery linear direction passing through the crosspoint 23 of the heating body 20 on an imagery plane including the heating body 20. Also, the tilt angle, that is, the y tilt angle, is a degree that the imagery linear direction is inclined with respect to the direction of the Earth's gravity.

The principle and method of measuring acceleration and a tilt angle using the apparatus 100 for measuring acceleration and a tilt angle according to the present embodiment configured as above are described below in detail.

When the pressure of the fluid 1 changes in the container 10, the change of the pressure affects the thermal convection of the fluid 1, which causes an error in the measurement of the acceleration and tilt angle. Thus, the process of accurately measuring acceleration and a tilt angle when the pressure of the fluid 1 in the container 10 is constant is described below.

When the crosspoint 23 of the heating body 20 shown in FIGS. 1 and 2 is set as the origin (x=0, y=0, z=0) in spatial coordinates and only the acceleration of gravity applies in the −z direction, by applying current from the current supply apparatus to the electrodes 24 and 25, joules heat is generated in the heating body 20, that is, the first and second heating elements 21 and 22. Thus, the fluid 1 in the container 10, which is dependent on the joule heat, the heat conductivity of the fluid 1, and the boundary condition in the container 10, has a spatial temperature distribution in the container 10. A portion of the fluid 1 that is located near the heating body 20 and thus heated by the heating body 20 has a temperature relatively higher than the other portion. Accordingly, the density of the portion decreased relatively so that the portion receives buoyancy in the opposite direction to the direction of the acceleration of the gravity, that is, in the +z direction. Thus, the portion of the fluid 1 heated by the heating body 20 flows toward an upper space (z>0) of the heating body 20. When the heated portion of fluid 1 flows, since the space taken by the heated portion of the fluid 1 is emptied, the empty space is filled as a fluid located in a lower space (z<0) of the heating body 20 and having a temperature relatively lower than that of the heated portion of the fluid 1 flows in the +z direction. The temperature of the portion of the fluid 1 moving to the upper space (z>0) of the heat body 20 as above decreases as it is separated away from the heating body 20. Consequently, the portion flows along an inner wall of the container 10 in the −z direction and fills the lower space (z<0) of the heating fluid 20.

Therefore, when the joule heat is generated in the heating body 20 by applying current to the heating body 20 as described above, circulation of the fluid 1, that is, thermal convection, is generated in the container 10.

When an acceleration $a_y$ is applied in the +y direction, the direction of the thermal convection of the fluid 1 around the heating body 20 is influenced by the vector sum of the acceleration $a_y$ and the acceleration of the gravity g and changed to the opposite direction of the vector sum, as shown in FIG. 3. The strength of the thermal convection around the heating body 20, that is, the average speed of the flow of the fluid 1 changes in proportion to the magnitude of the vector sum. Since most of the heat generated by the heating body 20 is cooled by the fluid 1, the change in the magnitude and direction of the thermal convection changes the degree of cooling of the heating body 20, that is, the temperature of the heating body 20. Also, the magnitude and speed of the change of the thermal convection increase as the fluid 1 is closer to the heating body 20 that generates heat.

FIGS. 4 and 5 show the results of a simulation for cases in which acceleration having the same magnitude of the acceleration of gravity "g" is applied in the +y direction and the −y direction, respectively. FIGS. 4 and 5 show patterns of the thermal convection of the fluid 1 generated on the x-y plane shown in FIG. 1. In FIGS. 4 and 5, arrows indicate the direction of flow of the fluid 1 and the length of each line indicating the pattern of the thermal convection is proportional to the flow speed of the fluid 1. The average temperature of the heating body 20 heated by the supplied current is about 150° C. and the average temperature of the container 10 is 25° C. It can be seen that the change in the direction and speed of the flow of the fluid 1, that is, the change of the thermal convection, according to the change in acceleration is generated around the crosspoint 23 at the maximum. Thus is because heat is highly concentrated on and around the crosspoint 23 of the heating body 20. Therefore, the crosspoint 23 of the heating body 20 is most sensitively influenced by the thermal convection and accordingly the degree of cooling of the heating body 20, that is, the change of the temperature, is most generated around the crosspoint 23.

In detail, when the acceleration having the same magnitude as the acceleration of gravity is applied in the +y direction as shown in FIG. 3, the portion of the fluid 1 located in the space (y>0) where the heating body 20 is located and having a temperature higher than the average temperature of the whole of the fluid 1 is influenced by the vector sum of the acceleration $a_y$ and the acceleration of gravity g as shown in FIG. 3 so that the portion flows in the opposite direction to the vector sum and cools the crosspoint 23 of the heating body 20. In contrast, when the acceleration having the same magnitude as the acceleration of gravity is applied in the −y direction, the portion of the fluid 1 located in the space (y<0) where the thermocouple 30 is located and having a temperature lower than the average temperature of the whole of the fluid 1 is influenced by the vector sum of the acceleration $a_y$ and the acceleration of gravity g so that the portion flows in the opposite direction to the vector sum and cools the crosspoint 23 of the heating body 20.

Thus, the temperature of the crosspoint 23 of the heating body 20 measured when the acceleration is applied in the +y direction is higher than that of the crosspoint 23 of the heating body 20 measured when the acceleration is applied in the −y direction. Since the size of the change in the temperature of the crosspoint 23 of the heating body 20 is dependent on the magnitude of the acceleration acting in the y-axis direction, by measuring the temperature of the crosspoint 23 of the heating body 20 using the thermocouple 30, the direction and magnitude of the acceleration acting in the y-axis direction with a higher sensitivity and faster response speed can be obtained.

When the apparatus 100 for measuring acceleration and a tilt angle according to the present embodiment configured as above is used, the y tilt angle can be measured as follows. As shown in FIG. 6, when only the acceleration of gravity is applied to the apparatus 100 for measuring acceleration and a tilt angle, the x axis is fixed perpendicular to the direction of the Earth's gravity and the y axis is inclined such that the +y direction makes an "h" radian with respect to the direction of the Earth's gravity. In this state, when the acceleration of gravity is vector-decomposed, the acceleration $a_y$ acting in the inclined y-axis direction is given as in an equation "$a_y$=g cos(h)" with respect to the acceleration of gravity. Thus, when the acceleration $a_y$ in the y-axis direction is obtained by performing the above process for obtaining the acceleration, a tilt angle h can be obtained from the equation "$a_y$=g cos(h)".

Figure 7:
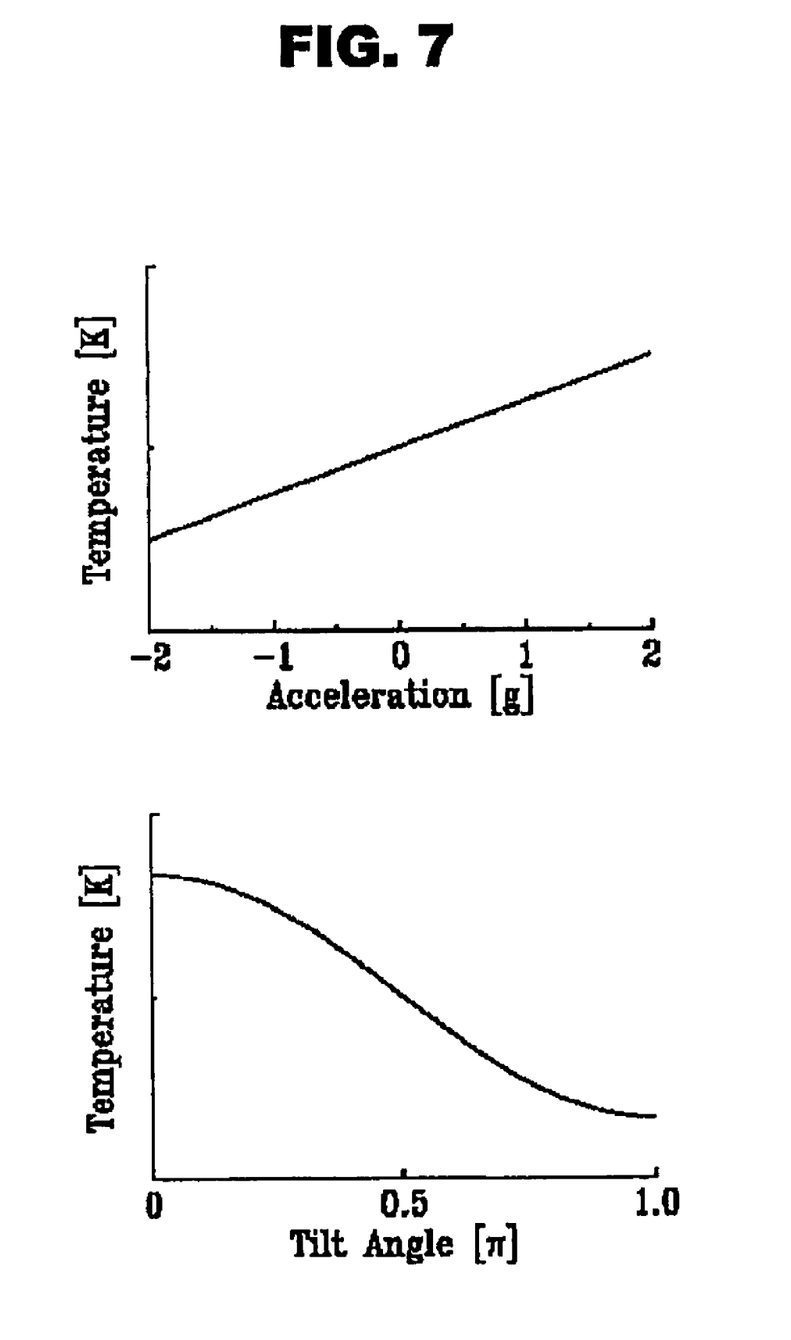
FIG. 7 shows temperature characteristic curves of a crosspoint of a heating body in the apparatus of FIG. 1, which are respectively dependent on the acceleration in the y-axis direction and the tilt angle with respect to the direction of the Earth's gravity.

FIG. 7 shows the distribution of temperature at the crosspoint 23 of the heating body 20 depending on the tilt angle h and the distribution of acceleration acting in the y-axis direction in the apparatus 100 for measuring acceleration and a tilt angle when a predetermined amount of current is applied to the heating body 20 so that the average temperature of the heating body 20 is about 150° C. and the average temperature of the container 102 is 25° C. Referring to FIG. 7, it can be seen that the temperature of the crosspoint 23 of the heating body 20 responds linearly to the magnitude of the acceleration acting in the y-axis direction. Consequently, since the apparatus 100 for measuring acceleration and a tilt angle according to the present embodiment measures the temperature of the crosspoint 23 of the heating body 20 and utilizes the characteristic curve shown in FIG. 7 when the pressure of the fluid 1 is constant, the acceleration acting in the y-axis direction and the tilt angle with respect to the direction of the Earth's gravity can be obtained with a high sensitivity and a fast response speed.

Figure 8:
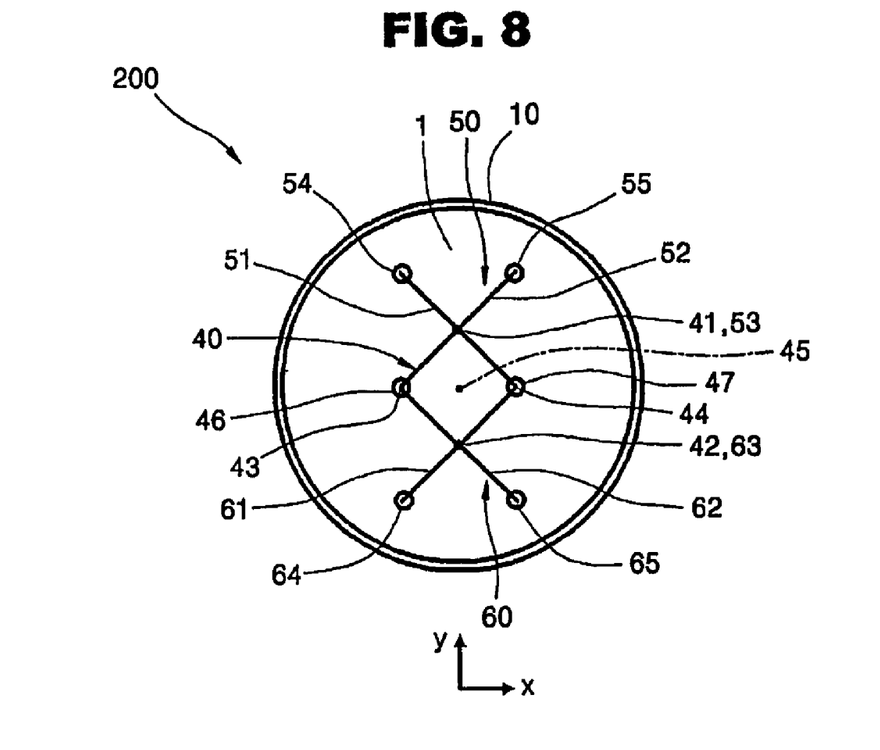
FIG. 8 is a cross-sectional view of an apparatus for measuring acceleration and tilt angle according to another embodiment of the present invention, in the z-axis direction.

FIG. 8 shows an apparatus 200 for measuring acceleration and a tilt angle according to another embodiment of the present invention. Referring to FIG. 8, the apparatus 200 for measuring acceleration and a tilt angle includes the container 10, a heating body 40, a first thermocouple 50, and a second thermocouple 60.

The heading body 40 is arranged in the container 10. The heating body 40 is rectangular, in particular, a square in the present embodiment. The heating body 40 is point-symmetrical with respect to an imagery center pointer 45 located midway between a first crosspoint 41 and a second crosspoint 42 that are described later. The heating body 40 includes the first crosspoint 41, the second crosspoint 42, a third crosspoint 43, and a fourth crosspoint 44 which are electrically connected to one another. The first and second crosspoints 41 and 42 are arranged to face each other while the third and fourth crosspoints 43 and 44 are arranged to face each other. The third and fourth crosspoints 43 and 44 of the heating body 40 are electrically connected to electrodes 46 and 47. A current supply apparatus (not shown) for supplying current to the electrodes 46 and 47 are connected to the electrodes 46 and 47. When current is supplied by the current supply apparatus, joule heat is generated in the heating body 40.

The first thermocouple 50 includes a first conductive wire 51, a second conductive wire 52, and a thermocouple junction 53. The first and second conductive wires 51 and 52 are formed of a metal material such as nickel and chromium. The first and second conductive wires 51 and 52 are formed of different metals. The thermocouple junction 53 is formed as end portions of the first and second conductive wires 51 and 52 are electrically connected. The thermocouple junction 53 contacts the first crosspoint 41 of the heating body 40. The other end portions of the first and second conductive wires 51 and 52 are electrically connected to electrodes 54 and 55, respectively. A voltage measurement apparatus (not shown) for measuring a voltage between the electrodes 54 and 55 is connected to the electrodes 54 and 55.

The second thermocouple 60 is point-symmetrical with the first thermocouple 50 with respect to the imagery center point 45. The second thermocouple 60 includes a third conductive wire 61, a fourth conductive wire 62, and a thermocouple junction 63. The third and fourth conductive wires 61 and 62 are formed of a metal material such as nickel and chromium. The third and fourth conductive wires 61 and 62 are formed of different metals. The thermocouple junction 63 is formed as end portions of the third and fourth conductive wires 61 and 62 are electrically connected. The thermocouple junction 63 contacts the second crosspoint 42 of the heating body 40. The other end portions of the third and fourth conductive wires 61 and 62 are electrically connected to electrodes 64 and 65, respectively. A voltage measurement apparatus (not shown) for measuring a voltage between the electrodes 64 and 65 is connected to the electrodes 64 and 65.

The temperatures of the first and second crosspoints 41 and 42 of the heating body 40 can be calculated using the voltages measured by the voltage measurement apparatus. The magnitude and direction of acceleration and a tilt angle can be independently measured using the difference of the measured temperatures. The direction of the acceleration is an imagery linear direction passing each of the first and second crosspoints 41 and 42. The tilt angle, that is, the y tilt angle, refers to the degree of inclination of the imagery linear direction with respect to the direction of the Earth's gravity.

In the method of measuring acceleration and a tilt angle using the apparatus 200 for measuring acceleration and a tilt angle configured as above, when the pressure of the fluid 1 in the container 10 is constant, current is applied to the heating body 40 and the acceleration $a_y$ is applied to the y-axis direction shown in FIG. 8. A thermal convection component in the y-axis direction is generated around the heating body 40 like the previous embodiment of the present invention. In the present embodiment, however, since the heating body 40 is point-symmetrical with respect to the imagery center point 45, a portion of the heating body 40 located around each of the first and second crosspoints 41 and 42 has an reversed shape to each other with respect to the y-axis direction.

Thus, cooling effects by the thermal convection in the y-axis direction on the first and second cross points 41 and 42 of the heating body 40 are opposite to each other. For example, when the acceleration $a_y$ acts in the +y direction, a thermal convection component in the −y direction is generated so that the first crosspoint 41 is cooled by the portion of the fluid 1 that has a temperature lower than the average temperature of the overall fluid 1 as described above with reference to FIG. 5. In contrast, the second crosspoint 42 is cooled by the portion of the fluid 1 that has a temperature higher than the average temperature of the overall fluid 1 as described above with reference to FIG. 4. Thus, the temperature of the second crosspoint 42 of the heating body 40 is higher than that of the first crosspoint 41.

Since the temperatures of the first and second cross points 41 and 42 of the heating body 40 are different from each other, when the acceleration $a_y$ acts in the +y direction, the difference $(T_1-T_2)$ between the temperature $T_1$ of the first crosspoint 41 measured from the first thermocouple 50 and the temperature $T_2$ of the second crosspoint 42 measured from the second thermocouple 60 becomes a negative value that is proportional to the magnitude of the acceleration $a_y$. In contrast, when the acceleration $a_y$ acts in the −y direction, the temperature difference $(T_1-T_2)$ between the first and second crosspoints 41 and 42 becomes a positive value that is proportional to the magnitude of the acceleration $a_y$. Consequently, the apparatus 200 for measuring acceleration and a tilt angle according to the present embodiment can obtain the direction and magnitude of the acceleration acting in the y-axis direction with a high sensitivity and a fast response speed, as in the previous embodiment, by measuring the temperature difference between the two cross points 41 and 42 of the heating body 40 when the pressure of the fluid 1 is constant. Also, the apparatus 200 can measure the y tilt angle with respect to the direction of the Earth's gravity using the method described in the previous embodiment with reference to FIG. 6.

In the meantime, the pressure of the fluid 1 in the container 10 can be changed according to the change in the pressure or temperature outside the container 10. In this case, since the degree of cooling of the heating body by the thermal convection of the fluid 1 is dependent on not only the acceleration but also the pressure of the fluid 1, the acceleration $a_y$ and the y tilt angle cannot be accurately obtained. A method of accurately obtaining the acceleration $a_y$ and the y tilt angle is described below even when the pressure of the fluid 1 changes.

Figure 9:
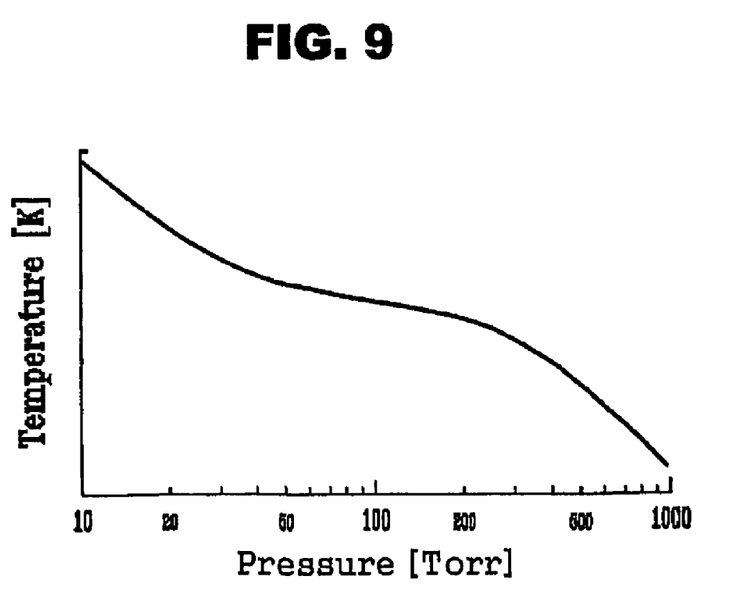
FIG. 9 is a graph showing the temperature characteristic curve measured at a crosspoint of the heating body when the pressure of the fluid in the container changes in the apparatus of FIG. 8.

FIG. 9 shows the change in the temperature of the first thermocouple 50 contacting the first crosspoint 41 according to the change in the pressure of the container 10 when the fluid 1 is nitrogen gas and a predetermined amount of joule heat is generated by the heating body 40. Referring to FIG. 9, in general, as the pressure of the fluid 1 increases, thermal convection is further generated so that the degree of cooling of the heating body 40 increases. In contrast, when the pressure of the fluid 1 decreases, the degree of cooling of the heating body 40 by the thermal convection decreases. Accordingly, when the pressure of the fluid 1 changes according to the change in the pressure or temperature generated outside the container 10, the temperature of the cross points 41 and 42 of the heating body 40 is changed not only by the acceleration but also by the pressure of the fluid 1. Thus, the acceleration $a_y$ and the y tilt angle cannot be accurately obtained from the temperature difference $(T_1-T_2)$.

However, since the first and second cross points 41 and 42 receive the opposite cooling effects by the acceleration $a_y$, the sum $(T_1+T_2)$ of the temperature $T_1$ of the first crosspoint 41 and the temperature $T_2$ of the second crosspoint 42 is always constant regardless of the acceleration $a_y$ and dependent on the pressure of the fluid 1 only. Thus, in the apparatus 200 for measuring acceleration and a tilt angle according to the present embodiment, the pressure of the fluid 1 can be obtained from the temperature sum $(T_1+T_2)$. By correcting the change in the pressure of the fluid 1 with respect to the temperature difference $(T_1-T_2)$ using the obtained pressure of the fluid 1, the acceleration acting the in the y-axis direction and the y tilt angle with respect to the direction of the Earth's gravity can be accurately obtained even when the pressure of the fluid 1 changes.

Figure 10:
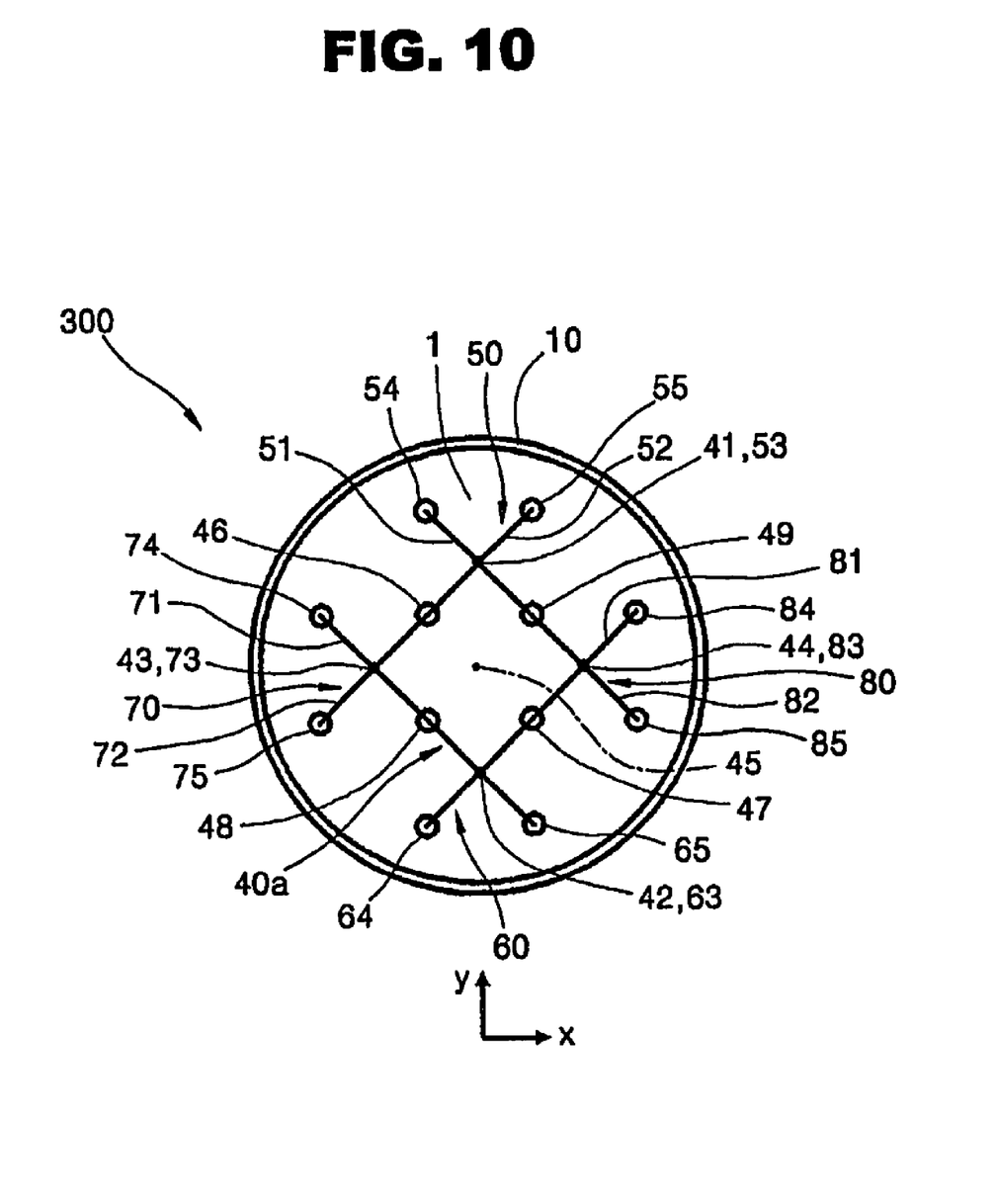
FIG. 10 is a cross-sectional view of an apparatus for measuring acceleration and tilt angle according to yet another embodiment of the present invention, in the z-axis direction.

FIG. 10 shows an apparatus 300 for measuring acceleration and a tilt angle according to a yet another embodiment of the present invention. In FIG. 10, the same reference numbers as those in the previous above-described embodiment shown in FIG. 8 denote the same elements having the same functions and the elements that are slightly altered are indicated with a suffix of "a". Since many portions between the embodiments shown in FIGS. 8 and 10 are the same, different portions only are described in detail. Referring to FIG. 10, the apparatus 300 for measuring acceleration and a tilt angle according to the present embodiment includes the container 10 containing the fluid 1, a heating body 40a, the first thermocouple 50, the second thermocouple 60, a third thermocouple 70, and a fourth thermocouple 80.

In the heating body 40a, as shown in FIG. 10, four electrodes 46, 47, 48, and 49 are electrically connected to one another and arranged in a point symmetry with respect to the imagery center point 45. While the electrodes 46 and 47 are electrically connected to the (+) pole of the current supply apparatus (not shown), the electrodes 48 and 49 are electrically connected to the (−) pole of the current supply apparatus. A current route from the electrode 46 to the electrodes 48 and 49 via the first and third cross points 41 and 43 and a current route from the electrode 47 to the electrodes 48 and 49 via the first and third cross points 42 and 44 generate joule heat by the current supplied by the current supply apparatus and the resistance of the heating body 40.

The third thermocouple 70 includes a fifth conductive wire 71, a sixth conductive wire 72, and a thermocouple junction 73. The fifth and sixth conductive wires 71 and 72 are formed of metal materials such as nickel and chromium which are different from each other. The thermocouple junction 73 is formed by electrically connecting end portions of the fifth and sixth conductive wires 71 and 72 and contacts the third crosspoint 43 of the heating body 40. The other end portions of the fifth and sixth conductive wires 71 and 72 are electrically connected to electrodes 74 and 75, respectively. A voltage measurement apparatus (not shown) which can measure a voltage between the electrodes 74 and 75 is connected to the electrodes 74 and 75.

The fourth thermocouple 80 is point-symmetrical with the third thermocouple 70 with respect to the imagery center point 45. The fourth thermocouple 80 includes a seventh conductive wire 81, a eighth conductive wire 82, and a thermocouple junction 83. The seventh and eighth conductive wires 81 and 82 are formed of metal materials such as nickel and chromium which are different from each other. The thermocouple junction 83 is formed by electrically connecting end portions of the seventh and eighth conductive wires 81 and 82 and contacts the fourth crosspoint 44 of the heating body 40. The other end portions of the seventh and eighth conductive wires 81 and 82 are electrically connected to electrodes 84 and 85, respectively. A voltage measurement apparatus (not shown) which can measure a voltage between the electrodes 84 and 85 is connected to the electrodes 84 and 85.

In the apparatus 300 for measuring acceleration and a tilt angle configured as above, as in the above-described embodiment shown in FIG. 8, the magnitude and direction of the acceleration can be accurately obtained by correcting an error generated due to the change in the pressure of the fluid 1. Both embodiments are different in that the accelerations in the y and x directions and the y and x tilt angles can be obtained, which are descried below in detail. The y tilt angle is the same as the tilt angle in the above-described embodiment shown in FIG. 8 and the x tilt angle refers to the degree of inclination of an Imagery line passing the third and fourth cross points 43 and 44 with respect to the direction of the Earth's gravity.

When the pressure of the fluid 1 in the container 10 is constant and an acceleration a acts at an angle with the x axis on the x-y plane shown in FIG. 10, the y-axis component $a_y$ of the acceleration a generates a thermal convection component in the y-axis direction around the heating body 40a as shown in the above-described embodiment shown in FIG. 8. Portions of the heating body 40 located around the third crosspoint 43 and the fourth crosspoint 44 which are located on the x-axis have the reversed shapes with respect to the x-axis direction, but the same shapes with respect to the y-axis direction. Thus, the third and fourth crosspoints 43 and 44 located on the x-axis equally receive the cooling effect by the thermal convection component in the y-axis direction. A difference in the temperature due to the acceleration component $a_y$ is not generated between the third and fourth crosspoints 43 and 44. Portions of the heating body 40 located around the first crosspoint 41 and the second crosspoint 42 which are located on the y-axis have the reversed shapes with respect to the y-axis direction. Thus, the first and second crosspoints 41 and 42 located on the y-axis receive the cooling effect by the thermal convection component in the y-axis direction opposite to each other as in the above-described embodiment shown in FIG. 8. A difference in the temperature due to the acceleration component $a_y$ is generated between the first and second cross points 41 and 42.

Thus, when the acceleration component $a_y$ acts in the +y direction, the difference $(T_1-T_2)$ between the temperature $T_1$ of the first crosspoint 41 measured from the first thermocouple 50 and the temperature $T_2$ of the second crosspoint 42 measured from the second thermocouple 60 becomes a negative temperature value that is proportional to the magnitude of the acceleration component $a_y$. In contrast, when the acceleration component $a_y$ acts in the −y direction, the positive temperature value that is proportional to the magnitude of the acceleration component $a_y$ is obtained from the temperature difference $(T_1-T_2)$.

Likewise, the direction and magnitude of the x-axis component $a_x$ of the acceleration a are obtained from the sign and magnitude of a difference $(T_3-T_4)$ between the temperatures $T_3$ and $T_4$ measured from the third and fourth thermocouples 70 and 80 respectively contacting the third and fourth cross points 43 and 44 located on the x-axis. As a result, the apparatus 300 for acceleration and a tilt angle in the present embodiment can obtain the acceleration acting on the x-y plane and the y tilt angel and the x tilt angle with respect to the direction of the Earth's gravity with a high sensitivity and a faster response speed in the same method as that in the s above-described embodiment shown in FIG. 8, by measuring the temperature difference between the two pairs of cross points 41, 42, 43, and 44 of the heating body 40 when the pressure of the fluid 1.

In the apparatus 300 for measuring acceleration and a tilt angle according to the present embodiment, as in the above-described embodiment shown in FIG. 8, when the pressure of the fluid 1 in the container 10 changes according to the change in the pressure or temperature generated outside the container 10, the pressure of the fluid 1 can be obtained from the temperature sum $(T_1+T_2)$ of the first and second crosspoints 41 and 42 located on the y axis and the temperature sum $(T_3+T_4)$ of the third and fourth crosspoints 43 and 44 located on the x axis. Thus, by correcting the temperature differences $(T_1-T_2)$ and $(T_3-T_4)$ with the change in the pressure of the fluid 1 using the obtained pressure of the fluid 1, even when the pressure of the fluid 1 changes, the acceleration acting on the x-y plane and the y tilt angle and the x tilt angle with respect to the direction of the Earth's gravity can be accurately measured.

While this invention has been particularly shown and described with reference to preferred embodiments thereof, it will be understood by those skilled in the art that various changes in form and details may be made therein without departing from the spirit and scope of the invention as defined by the appended claims.

INDUSTRIAL APPLICABILITY

As described above, according to the present invention, since the mobile body that is essential for the conventional accelerometers is removed, the accelerometer having a simplified structure and improved durability can be manufactured in a simplified manufacturing process and at a low manufacturing cost. Also, the accelerometer according to the present invention can have improved sensitivity and response speed in measuring acceleration compared to the conventional convection type accelerometers. Furthermore, since a function of correcting the change in the pressure of a fluid which is dependent on the change in the external pressure or temperature is provided, simple and various packaging methods are available and the additional measurement of an external temperature is not needed.

What is claimed is:

1. An apparatus for measuring acceleration and a tilt angle using thermal convection of a fluid, the apparatus comprising:
    a container containing the fluid;
    a heating body including a first heating element and a second heating element arranged in the container and a crosspoint that is formed as end portions of the first and second heating elements are electrically connected, and radiating heat when current is applied through the other end portions of the first and second heating elements; and
    a thermocouple including a thermocouple junction that contacts the crosspoint of the heating body and being point-symmetric with the heating body with respect to the crosspoint of the heating body, wherein a voltage between both end portions of the thermocouple is measured to calculate a temperature of the crosspoint of the heating body,
    wherein acceleration acting in a direction along an imaginary line that passes the crosspoint of the heating body on an imaginary plane including the heating body and a tilt angle that is the degree of inclination of the imaginary line with respect to the direction of the Earth's gravity are measured using the temperature of the crosspoint of the heating body.

2. An apparatus for measuring acceleration, a tilt angle and pressure using thermal convection of a fluid, the apparatus comprising:
    a container containing the fluid;
    a heating body arranged in the container, having a rectangular shape to have a first crosspoint, a second crosspoint, a third crosspoint, and a fourth crosspoint that are electrically connected, being point-symmetrical with respect to an imaginary center point located in the middle of the first and second cross points facing each other, and radiating heat when current is applied;
    a first thermocouple including a thermocouple junction that contacts the first crosspoint of the heating body, wherein a voltage between both end portions of the first thermocouple is measured to calculate a first temperature of the first crosspoint of the heating body; and
    a second thermocouple including a thermocouple junction that contacts the second crosspoint of the heating body and being point-symmetric with the first thermocouple with respect to the imaginary center point, wherein a voltage between both end portions of the second thermocouple is measured to calculate a second temperature of the second crosspoint of the heating body,
    wherein acceleration acting in a direction along an imaginary line that passes the first and second crosspoints and a tilt angle that is the degree of inclination of the imaginary line with respect to the direction of the Earth's gravity are measured using a difference between the first temperature and the second temperature; and
    pressure of the fluid is measured using the sum of the first temperature and the second temperature.

3. The apparatus of claim 2, wherein current is applied to the heating body through the third and fourth cross points.

4. The apparatus of claim 2, further comprising:
a third thermocouple including a thermocouple junction that contacts the third crosspoint of the heating body, wherein a voltage between both end portions of the third thermocouple is measured to calculate a third temperature of the third crosspoint of the heating body; and
a fourth thermocouple including a thermocouple junction that contacts the fourth crosspoint of the heating body and being point-symmetric with the third thermocouple with respect to the imaginary center point, wherein a voltage between both end portions of the fourth thermocouple is measured to calculate a fourth temperature of the fourth crosspoint of the heating body,
wherein acceleration acting in a direction along an imaginary line that passes the third and fourth crosspoints and a tilt angle that is the degree of inclination of the imaginary line passing the third and fourth cross points with respect to the direction of the Earth's gravity are measured using a difference between the third temperature and the fourth temperature; and
pressure of the fluid is measured using the sum of the third temperature and the fourth temperature.

5. The apparatus of claim 4, wherein four electrodes are electrically connected to the heating body and point-symmetrical with respect to the imaginary center point.

6. A method of measuring acceleration, a tilt angle and pressure using thermal convection of a fluid using an apparatus for measuring acceleration, a tilt angle and pressure including a container containing the fluid, a heating body arranged in the container, having a rectangular shape to have a first crosspoint, a second crosspoint, a third crosspoint, and a fourth crosspoint that are electrically connected, and being point-symmetrical with respect to an imaginary center point located in the middle of the first and second cross points facing each other, a first thermocouple including a thermocouple junction that contacts the first crosspoint of the heating body, and a second thermocouple including a thermocouple junction that contacts the second crosspoint of the heating body and being point-symmetric with the first thermocouple with respect to the imaginary center point, the method comprising:

applying current to the heating body to make the heating body radiate heat to facilitate thermal convection of the fluid;

measuring a voltage between both end portions of the first thermocouple to calculate a first temperature of the first crosspoint of the heating body using the measured voltage and measuring a voltage between both end portions of the second thermocouple to calculate a second temperature of the second crosspoint of the heating body using the measured voltage;

calculating acceleration acting in a direction along an imaginary line that passes the first and second crosspoints and a tilt angle that is the degree of inclination of the imaginary line with respect to the direction of the Earth's gravity, using a difference between the first temperature and the second temperature;

summing the first temperature and the second temperature and calculating a pressure of the fluid in the container using the sum of the first temperature and the second temperature; and correcting acceleration and a tilt angle obtained from the calculating of the acceleration and the tilt angle using a pressure of the fluid obtained from the calculating of the pressure of the fluid in the container.

* * * * *